United States Patent
Lyngsø et al.

(10) Patent No.: US 11,573,366 B2
(45) Date of Patent: Feb. 7, 2023

(54) OPTICAL FIBER WITH LOW CHLORINE CONCENTRATION IMPROVEMENTS RELATING TO LOSS AND ITS USE, METHOD OF ITS PRODUCTION AND USE THEREOF

(71) Applicant: NKT PHOTONICS A/S, Birkerød (DK)

(72) Inventors: Jens Kristian Lyngsø, København S (DK); Christian Jakobsen, Virum (DK); Jesper Skov Gretlund, København S (DK); Harald R. Simonsen, Lejre (DK)

(73) Assignee: NKT PHOTONICS A/S, Birkerød (DK)

( * ) Notice: Subject to any disclaimer, the term of this patent is extended or adjusted under 35 U.S.C. 154(b) by 0 days.

(21) Appl. No.: 17/845,358

(22) Filed: Jun. 21, 2022

(65) Prior Publication Data
US 2022/0373733 A1    Nov. 24, 2022

Related U.S. Application Data

(63) Continuation of application No. 12/717,509, filed on Mar. 4, 2010, now Pat. No. 11,402,572.
(Continued)

(51) Int. Cl.
*G02B 6/02* (2006.01)
*C03B 37/012* (2006.01)
(Continued)

(52) U.S. Cl.
CPC ...... *G02B 6/02342* (2013.01); *C03B 37/0122* (2013.01); *C03C 13/045* (2013.01);
(Continued)

(58) Field of Classification Search
CPC ............ C03B 2201/03; C03B 2201/20; C03B 2201/21; C03B 2203/14; C03B 2203/16;
(Continued)

(56) References Cited

U.S. PATENT DOCUMENTS

| 5,410,428 A | 4/1995 | Yamagata et al. |
| 5,707,908 A | 1/1998 | Komine et al. |
| 5,790,736 A * | 8/1998 | Fabian ............... C03B 37/027 385/128 |

(Continued)

FOREIGN PATENT DOCUMENTS

| EP | 1845398 A1 * | 10/2007 | ....... C03B 37/01446 |
| EP | 4030204 A1 * | 7/2022 | |
| WO | WO-2022156956 A1 * | 7/2022 | |

OTHER PUBLICATIONS

Yu, et al., "Low loss silica hollow core fibers for 3-44m spectral region", Optics Express, vol. 20, No. 10, May 7, 2012.

*Primary Examiner* — Andrew Jordan
(74) *Attorney, Agent, or Firm* — Buchanan Ingersoll & Rooney P.C.

(57) ABSTRACT

An optical fiber having an axial direction and a cross section perpendicular to the axial direction, and a method and preform for producing such an optical fiber. The optical fiber is adapted to guide light at a wavelength $\lambda$, and includes a core region, an inner cladding region surrounding said core region, and at least one of a first type of feature including a void and a surrounding first silica material. The core, the inner cladding region and the first type of feature extends along said axial direction over at least a part of the length of the optical fiber. The first silica material has a first chlorine concentration of about 300 ppm or less.

20 Claims, 9 Drawing Sheets

Related U.S. Application Data (60) Provisional application No. 61/157,422, filed on Mar. 4, 2009.

(51) Int. Cl.
*C03C 13/04* (2006.01)
*C03C 25/66* (2006.01)

(52) U.S. Cl.
CPC .......... *C03C 25/66* (2013.01); *C03B 2201/03* (2013.01); *C03B 2201/20* (2013.01); *C03B 2201/21* (2013.01); *C03B 2203/14* (2013.01); *C03B 2203/16* (2013.01); *C03B 2203/42* (2013.01); *G02B 6/02352* (2013.01); *G02B 6/02357* (2013.01)

(58) Field of Classification Search
CPC ............ C03B 2203/42; C03B 37/0122; C03C 13/045; C03C 25/66; G02B 6/02342; G02B 6/02352; G02B 6/02357
See application file for complete search history.

(56) References Cited

U.S. PATENT DOCUMENTS

| | | |
|---|---|---|
| 5,907,652 A | 5/1999 | Digiovanni et al. |
| 5,908,482 A * | 6/1999 | Komine ................ C03C 4/0085 65/117 |
| 6,782,716 B2 | 8/2004 | Moore et al. |
| 6,985,661 B1 | 1/2006 | Russell et al. |
| 7,321,712 B2 | 1/2008 | Williams et al. |
| 11,402,572 B2 * | 8/2022 | Lyngsø ............... G02B 6/02342 |
| 2004/0096173 A1 | 5/2004 | Fekety et al. |
| 2004/0151454 A1 | 8/2004 | Fajardo et al. |
| 2004/0228592 A1 | 11/2004 | Gaeta et al. |
| 2004/0247271 A1 * | 12/2004 | Skovgaard ......... G02B 6/02357 385/125 |
| 2004/0263856 A1 * | 12/2004 | Willig .................. G01C 19/721 356/460 |
| 2005/0074215 A1 * | 4/2005 | Sanghera ........... G02B 6/02371 65/393 |
| 2005/0185908 A1 * | 8/2005 | Roberts ................. C03B 37/016 385/125 |
| 2006/0202125 A1 * | 9/2006 | Suhami .................. G01T 1/202 250/368 |
| 2007/0274666 A1 | 11/2007 | Aikawa et al. |
| 2009/0052853 A1 * | 2/2009 | Mukasa ............. G02B 6/02361 264/1.24 |
| 2009/0201953 A1 * | 8/2009 | Peyghambarian ........................... G02B 6/02338 65/435 |
| 2010/0266251 A1 | 10/2010 | Lyngsoe et al. |

* cited by examiner

OPTICAL FIBER WITH LOW CHLORINE CONCENTRATION IMPROVEMENTS RELATING TO LOSS AND ITS USE, METHOD OF ITS PRODUCTION AND USE THEREOF

CROSS REFERENCE TO RELATED APPLICATIONS

The present application is a continuation of U.S. application Ser. No. 12/717,509, filed on Mar. 4, 2010, which claims the benefit of U.S. Provisional Application No. 61/157,422, filed on Mar. 4, 2009. The entire contents of each of U.S. application Ser. No. 12/717,509, and U.S. Provisional Application No. 61/157,422 are hereby incorporated herein by reference in their entirety.

TECHNICAL FIELD

The invention relates to an optical fiber structure, a method of its production, a preform for producing it, and use of the optical fiber. The optical fiber may be a Hollow Core (HC) Photonic Crystal Fiber (PCF) comprising a microstructured cladding arranged to provide a Photonic Bandgap (PBG). The optical fiber may be a solid core (SC) Photonic Crystal Fiber (PCF) comprising a microstructured cladding arranged to provide an effective index of the cladding below that of the core. Photonic Crystal Fibers are also referred to as Microstructured Optical Fibers or Holey Fibers. The PBG may be realized by arranging the microstructured cladding in a manner, whereby it comprises a periodic modulation of the refractive index. In a HC-PCF comprising a PBG, light may be guided in a core having an effective refractive index below the effective refractive index of the surrounding material. The PBG guiding mechanism is fundamentally different from the total internal reflection guiding mechanism, which is exploited in for example Large Mode Area (LMA) PCFs. In a HC-PCF guiding light by the PBG mechanism, a large fraction of the optical power may be present in the hollow core and in the holes of the cladding, which result in a low power-in-glass fraction (<5%), which in turn may give rise to a very low non-linear coefficient and low loss due to intrinsic material absorption. Hollow and solid core PCFs may be fabricated by the stack-and-draw technique, where a large-scale preform is prepared by stacking the elements of the preform, and subsequently drawing the preform to a fiber.

BACKGROUND

General methods of producing photonic crystal fibers are known from e.g. U.S. Pat. Nos. 7,321,712, and 6,985,661.

Typically, PCFs are produced using low loss silica material. Reduction of OH is one parameter for reducing losses of optical fiber for wavelengths of around 800 nm to beyond 2500 nm. Typically, low OH glasses have relatively high Chlorine content, as Chlorine is used to reduce OH. Examples of low loss silica materials include F300 and F500 capillary tubes that are commercially available from Hereaus. F300 and F500 capillary tubes are for example used for optical fibers in telecommunications, amplifier and laser applications. Typical values of OH contamination in F300 materials are 0.2 ppm.

SUMMARY

The inventors of the present invention have realized that end facet degradation in an optical fiber having voids, such as a HC-PCF or a SC-PCF, can be significant reduced if the diffusion of Chlorine from silica glass forming at least a part of the optical fiber is reduced. Unless this degradation is kept at a minimum, the end facet is contaminated over time regardless of careful attempts to keep the end facet free of e.g. dust particles. The inventors assign the contamination to the formation of Chlorine containing compounds at the end facet when Chlorine from the silica glass surrounding the voids of the optical fiber diffuses into the voids and through these to the end facet where Chlorine compounds are formed though e.g. reaction with water in the ambient air. The inventors have realized that the Chlorine diffusion may be reduced by forming at least parts of the optical fiber from silica glass with a Chlorine concentration below 300 ppm or by arranging silica glass with a Chlorine concentration below 300 ppm at or near the void surface of at least a part of the precursor elements of the preform, from which the optical fiber is produced.

Figure 1:
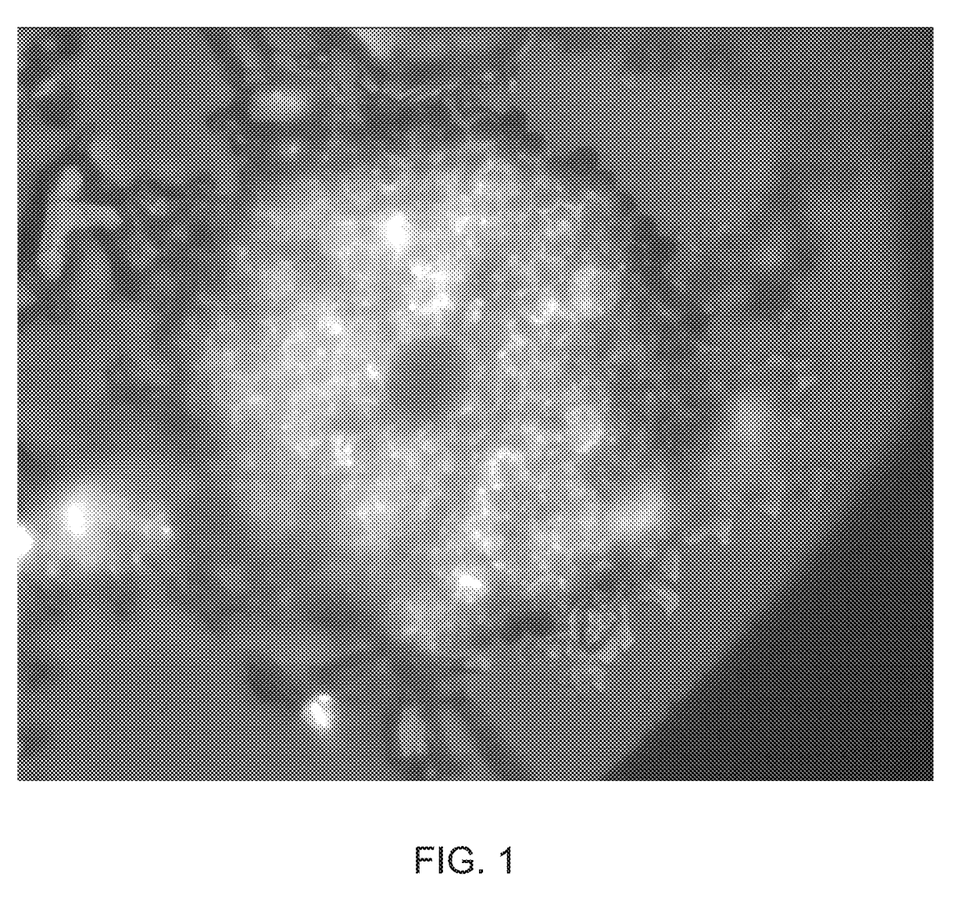
FIG. 1 shows end facet degradation in a Hollow-Core PCF (HC-PCF)

One possible path for the formation of Chlorine compounds at the fiber end face includes the diffusion of Perchlorate ions from the silica material through the voids to the fiber end facet, where they reacts with water in the ambient air forming crystalline hydrates. An alternative path may involve the formation of Ammonium Chloride salt at the end facet. A microscope image of the end-facet of a HC fiber showing end facet degradation, which is believed to be related to Chlorine containing compound is shown in FIG. 1, where significant end facet degradation is seen. The image is taken 25 hours after the fiber was cleaved and at it is evident, that the end facet is largely contaminated.

In the context of the present invention, the phrase "Chlorine concentration" refers to the atomic concentration regardless of whether the Chlorine is present as atomic Chlorine, Chlorine ions, molecular Chlorine, or as part of a molecule with other elements, such as Hydrochloric acid (HCl) or residual molecules originating from the formation of the silica glass of the optical fiber. In some cases, the Chlorine concentration of a given silica material may be non-uniform over the cross section of the fiber preform or optical fiber. This may for instance occur when there is a descending Chlorine concentration towards the void of a first precursor element or a first type of feature. In such cases, the phrase Chlorine concentration refers to the maximum local concentration of Chlorine in said material as seen over the cross section of the fiber preform or optical fiber. The phrases concentration and content are used interchangeably in this text.

The present inventors have realized that improved Photonic crystal fibers, including HC and SC fibers, can be realized using silica materials with low chlorine content, such as Chlorine content of less than 300 ppm.

In particular, the present inventors have realized that for wavelengths in the range from 800 nm to at least 2500 nm, HC fibers made from glass with low Chlorine content (and high OH content) has lower losses than HC fibers made from glass with high Chlorine content (and lower OH content)— despite the glass with high Chlorine having lower bulk glass losses.

The present inventors have realized that a low Chlorine content is one parameter for improving a HC fiber. The improvements relate to low losses (low attenuation) and low contamination in the fibers and/or at end-facets (end facet degradation) of the fibers.

The present inventors have further realized methods of producing improved microstructured fibers, including HC PCFs and SC PCFs.

The improvements include lower fiber attenuation, reduced contamination at fiber end-facets, reduced contamination at silica-air interfaces inside the fiber, reduction of amount of point scatters. Alternative improvements are also possible using the disclosed techniques and embodiments.

One object of the present invention is to provide an optical fiber adapted to guide light at a wavelength $\lambda$, said optical fiber having an axial direction and a cross section perpendicular to said axial direction. The optical fiber comprises a core region, an inner cladding region surrounding said core region, and at least one of a first type of feature comprising a void and a surrounding first silica material. The first silica material has a first attenuation coefficient, $\alpha_1$, at $\lambda$ and a first chlorine concentration, $c_1$, of about 300 ppm or less. The first type of feature extends along at least a part of the axial direction of the optical fiber.

One object of the invention is to provide a method for forming an optical fiber adapted to guide light at a wavelength $\lambda$, said method comprising providing a fiber preform and drawing said fiber preform to form said optical fiber. The preform comprises a core part and an inner cladding part arranged to provide a core region in the formed optical fiber and a surrounding inner cladding region, respectively, at least one of said parts comprising one or more precursor elements. The one or more precursor elements comprises at least one of a first type of precursor element comprising a void and a surrounding first silica material, said first silica material having a first attenuation coefficient, $\alpha_1$, at $\lambda$ and a first chlorine concentration, $c_1$, of about 300 ppm or less. The formed optical fiber having an axial direction and a cross section perpendicular to said axial direction.

The first silica material may be arranged to reduce the content of Chlorine or Chlorine compounds at or near the surfaces of the fiber end facet and at the surfaces of the voids in said first type of feature or in the first type of precursor element.

One object of the present invention is to provide a fiber preform for a Photonic Crystal Fiber, said fiber preform comprising a plurality of tubes arranged in a stack, wherein said tubes comprise a silica material with Chlorine content below 300 ppm. The plurality of tubes comprising a plurality of first type of features.

When the fiber preform is drawn to form an optical fiber, one first type of precursor element may define one first type of feature in the formed optical fiber, and the void in said first type of precursor element may result in the void in said first type of feature.

The fiber preform is drawn to an optical fiber using methods known the skilled person. The voids of the precursor elements may for example be pressurized during the drawing to control the void size of the first and/or second type of features in the formed optical fiber.

One object of the present invention is to provide a Photonic Crystal Fiber comprising a silica material with a plurality of elongated voids extending along the longitudinal direction of the fiber, said silica material having Chlorine content below 300 ppm. The Photonic Crystal Fiber may have a hollow or a solid core, and said fiber being drawn from a preform according to the present invention.

One object of the present invention is to provide a material for producing a Photonic Crystal Fiber, said material comprising a Silica glass with Chlorine content of less than 300 ppm. The chlorine content may be about 250 ppm or less, such as about 200 ppm or less, such as about 150 ppm or less, such as about 100 ppm or less, such as about 50 ppm or less, such as about 25 ppm or less, such as about 10 ppm or less, such as about 5 ppm or less, such as about 1 ppm or less, such as about 0.5 ppm or less, such as about 0.2 ppm or less, such as about 0.1 ppm or less, such as about 0.01 ppm or less, such as substantially free of Chlorine. The material may be produced in a method not including silicum tetra chloride. The PCF may be produced substantially from this material or the material may be one of several used to produce the PCF.

In an optical fiber adapted to guide light at a wavelength $\lambda$, said optical fiber comprising a plurality of voids extending in the longitudinal direction of the fiber, the optical fiber is improved by having at least a part of said voids surrounded by a first silica material having a first chlorine concentration, $c_1$, of about 300 ppm or less.

In a fiber preform for forming an optical fiber adapted to guide light at a wavelength $\lambda$, said fiber preform comprising a plurality of voids extending in the longitudinal direction of the fiber, the fiber preform is improved by having at least a part of said voids surrounded by a first silica material having a first chlorine concentration, $c_1$, of about 300 ppm or less.

The first chlorine concentration may be about 250 ppm or less, such as about 200 ppm or less, such as about 150 ppm or less, such as about 100 ppm or less, such as about 50 ppm or less, such as about 25 ppm or less, such as about 10 ppm or less, such as about 5 ppm or less, such as about 1 ppm or less, such as about 0.5 ppm or less, such as about 0.2 ppm or less, such as about 0.1 ppm or less, such as about 0.01 ppm or less, such as substantially free of Chlorine.

In one embodiment, the core region of the optical fiber comprises at least one of said first type of feature. The first type of feature may be arranged to substantially form the core region and the optical fiber may be a hollow core fiber. In a hollow-core PCT, the core region may be surrounded by an inner cladding region comprising a plurality of the first type of feature or another type of feature. One way of realizing a hollow-core PBG fiber would be to have a first type of feature with a larger cross sectional diameter (the core region) being surrounded by a plurality of the first type of feature with a different cross sectional diameter, such as a smaller cross sectional diameter (the inner cladding region), where the inner cladding provided a Photonic Bandgap in at least one wavelength range. The hollow core may be surrounded by a solid inner cladding region, such as in a solid cladding Bragg fiber, where alternating layers of material with different refractive indices provides the confinement of light to the hollow core and hence the guiding mechanism of the optical fiber.

Figure 2:
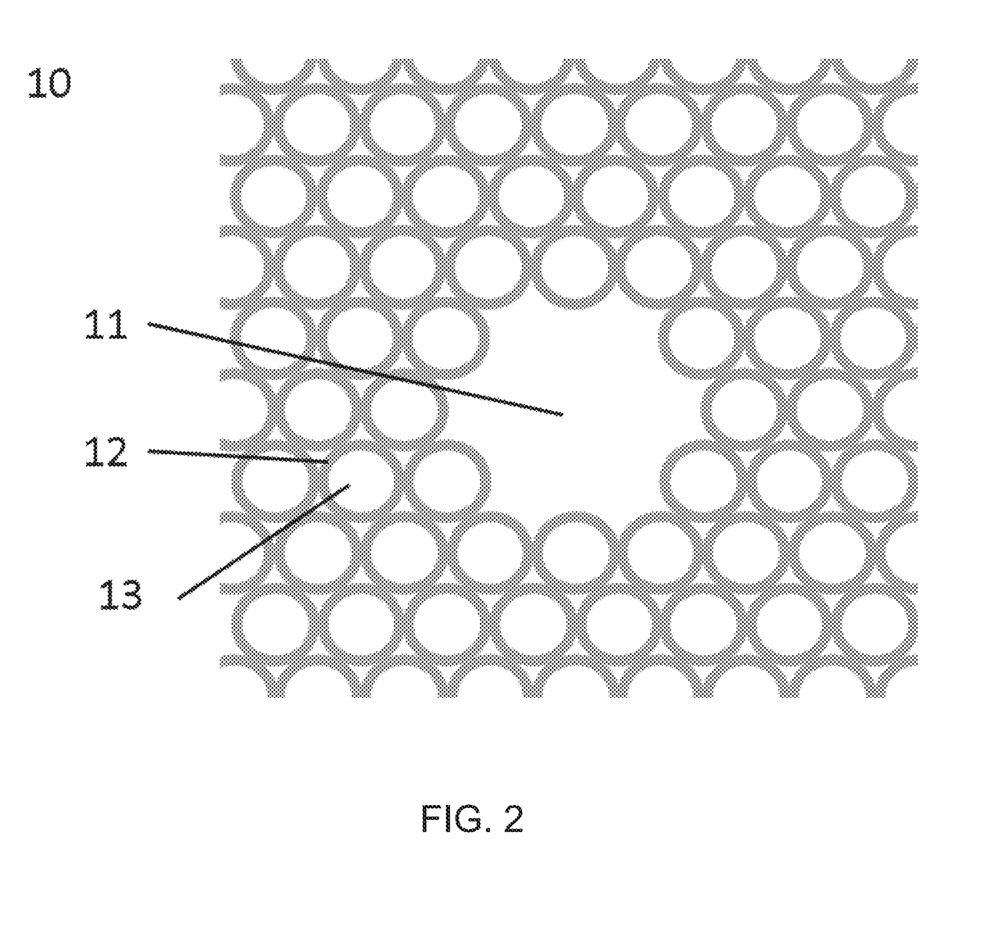
FIG. 2 shows a schematic illustration of a section of a fiber preform with a plurality of first type of precursor elements in a closed-packed hexagonal arrangement.

In one embodiment, inner cladding region of the optical fiber comprises a plurality of said first type of feature. This plurality of first type of feature may be arranged in a periodic pattern such as a closed-packed hexagonal pattern resulting from arranging a plurality of first type of precursor elements in a closed-packed hexagonal arrangement in the fiber preform as illustrated in FIG. 2. This figure shows a schematic illustration of a section of a fiber preform 10 where a plurality of first type of precursor elements 12 with voids 13 surrounds a core 11 part defined by omitting 7 neighboring features. A closed packed hexagonal arrangement of prior art precursor elements is described for instance in U.S. Pat. No. 6,985,661. The first type of features may also be arranged in a chain surrounding the core region as described in for instance U.S. Pat. No. 5,907,652, wherein a high numerical aperture core is surrounded by a ring of closely spaced voids separated by thin silica bridges. These bridges may be formed in said first silica material. In principle may the plurality of first type of feature and any other type of feature be arranged in any periodic or non-periodic pattern depending on fabrication method and desired optical property of the optical fiber.

In one embodiment, the core region comprises a solid core. This may be the case in a step index fiber, where the core may be surrounded by an inner cladding comprising a plurality of the first type of feature.

In one embodiment, the first type of feature further comprises a second silica material with a second attenuation coefficient, $\alpha_2$, at $\lambda$ and second chlorine concentration, $c_2$. The second attenuation coefficient may be smaller than said first attenuation coefficient. The second chlorine concentration may larger than said first chlorine concentration.

The first silica material may be arranged to provide a diffusion barrier for Chlorine situated in said second silica material, thereby mitigating the diffusion of said Chlorine into said voids of said first type of precursor element or said at least a first type of feature.

For at least a part of said plurality of the first type of precursor element or feature, the first silica material may be arranged between the void and the second silica material, i.e. the second silica material surrounds the first silica material and the void. Thereby the first silica material may form a Chlorine diffusion barrier, which may reduce the diffusion of Chlorine from the second silica material into the void of the first type of precursor element or feature. A diffusion barrier in the first type of precursor element reduces the diffusion of Chlorine into the void during the drawing of the optical fiber where the fiber preform is maintained for some time at an elevated temperature. If the diffusion of Chlorine into the voids of the first type of precursor element and accordingly into the void of a first type of feature, there is less Chlorine which may form compounds at the surface of the voids or to diffuse though the voids to form Chlorine compounds there. Accordingly Chlorine induced end facet degradation may be mitigated.

In one embodiment, the first silica material is arranged to surround said second silica material. In some fiber designs there is a significant power-in-glass fraction in some parts of the optical fiber, such as in the core region and in the inner cladding region close to the core region. The silica material, wherein the power-in-glass fraction is significant is often in direct contact with the void, and it may be preferred that silica material with a low attenuation at the wavelength $\lambda$ is arranged in direct contact with the void. Some low Chlorine content silica materials have a high attenuation due to the content of OH and it may be preferable to arrange a layer of the second silica material (having a lower attenuation coefficient) in direct contact with the void, and accordingly accept a higher Chlorine content in the this region. This fiber design may still provide an advantage over prior art fiber designs in that the layer of second material may be relatively thin and the out diffusion of Chlorine from this region may be significantly less than what would have been the case if all the silica material have a high Chlorine concentration. The silica material (with a high Chlorine concentration) of prior art fibers may act as a Chlorine reservoir maintaining a high level of Chlorine out-diffusion for an extended period of time.

In one embodiment, the first type of feature may further comprise a third silica material arranged to surround said first and second silica materials, said third silica material having a third attenuation coefficient, $\alpha_3$, at $\lambda$ and a third chlorine concentration, $c_3$. The third chlorine concentration may be smaller than said second chlorine concentration.

The third chlorine concentration may be about 250 ppm or less, such as about 200 ppm or less, such as about 150 ppm or less, such as about 100 ppm or less, such as about 50 ppm or less, such as about 25 ppm or less, such as about 10 ppm or less, such as about 5 ppm or less, such as about 1 ppm or less, such as about 0.5 ppm or less, such as about 0.2 ppm or less, such as about 0.1 ppm or less, such as about 0.01 ppm or less, such as substantially free of Chlorine In one embodiment, the first silica material of the first type of feature is arranged in a substantially annular region with a first thickness in the range of about 10 nm to about 5000 nm, such in the range of about 50 nm to about 4000 nm, such in the range of about 100 nm to about 3000 nm such in the range of about 200 nm to about 2000 nm, such in the range of about 300 nm to about 1000 nm, such in the range of about 400 nm to about 800 nm, such in the range of about 400 nm to about 600 nm. In the context of the present application, the first thickness is defined as the cross sectional dimension of the first silica material along a radial direction from the center of the void. When the cross sectional dimension of the layer of the first silica material is not uniform around the void, the thickness is defined as the average value of the first silica material. Equivalent definitions may be defined for further silica materials such as the second and third silica materials. In one embodiment, the third silica material is arranged in a substantially annular region with the third thickness being in the range of about 10 nm to about 5000 nm, such in the range such in the range of about 50 nm to about 4000 nm, such in the range of about 100 nm to about 3000 nm such in the range of about 200 nm to about 2000 nm, such in the range of about 300 nm to about 1000 nm, such in the range of about 400 nm to about 800 nm, such in the range of about 400 nm to about 600 nm. The thickness of the first and third silica materials in the optical fiber may be determined from the thickness of the corresponding layers in the precursor elements of the fiber preform from which the optical fiber is formed.

In one embodiment, the first silica material of the first type of precursor element is arranged in a substantially annular region with a thickness which after drawing of the optical fiber results in a thickness in the range of about 10 nm to about 5000 nm, such in the range of about 50 nm to about 4000 nm, such in the range of about 100 nm to about 3000 nm such in the range of about 200 nm to about 2000 nm, such in the range of about 300 nm to about 1000 nm, such in the range of about 400 nm to about 800 nm, such in the range of about 400 nm to about 600 nm.

In one embodiment, the first type of precursor element comprises a third silica material which may be arranged in a substantially annular region with a thickness which after drawing of the optical fiber results in a thickness in the range of about 10 nm to about 5000 nm, such in the range of about 50 nm to about 4000 nm, such in the range of about 100 nm to about 3000 nm such in the range of about 200 nm to about 2000 nm, such in the range of about 300 nm to about 1000 nm, such in the range of about 400 nm to about 800 nm, such in the range of about 400 nm to about 600 nm.

Figure 9:
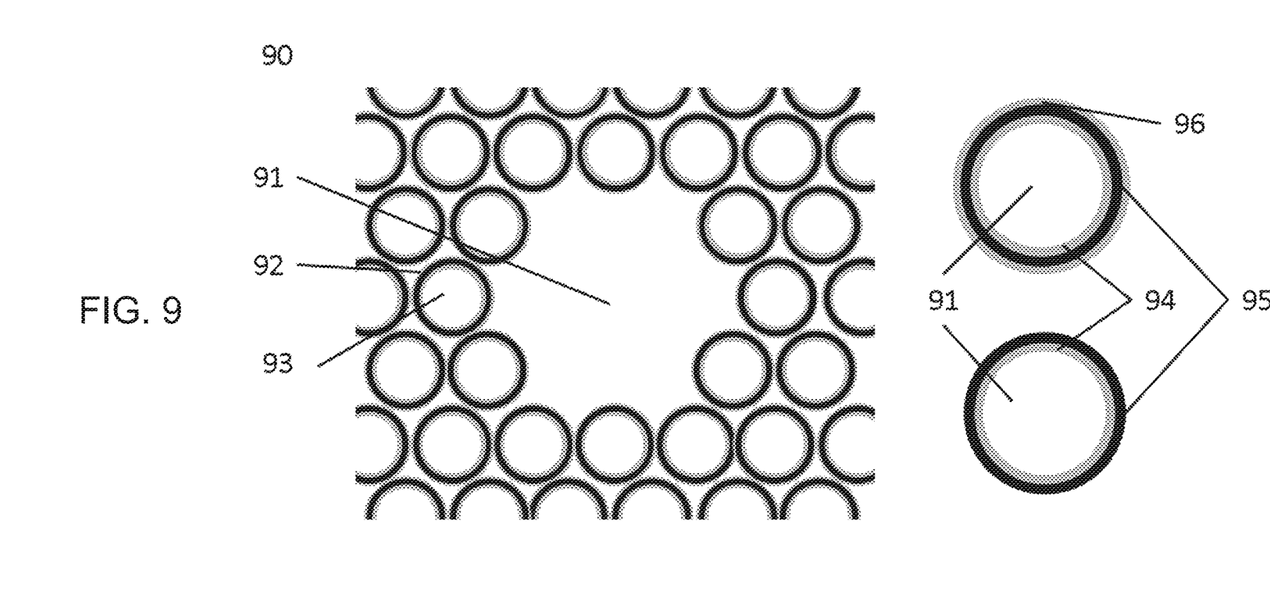
FIG. 9 shows a schematic illustration of a section of a fiber preform with a plurality of first type of precursor elements in a closed-packed hexagonal arrangement, together with two different embodiments of the first type of precursor element.

FIG. 9 shows a schematic illustration of a section of a fiber preform 90 where a plurality of first type of precursor elements 92 with voids 93 surrounds a core 91 part defined by omitting 7 neighboring features. The first type of precursor elements may comprise first silica material 94 surrounded by second silica material 95, which may be surrounded by third silica material 96. In this embodiment, the first and the third silica materials may define a diffusion barrier for chlorine in said second silica material.

The thicknesses in the precursor elements may preferably be such that the diffusion of Chlorine and Chlorine containing compounds to the surface of the voids of the precursor elements during the drawing of the optical fiber is reduced significantly. The use of silica material with a Chlorine concentration of about 300 ppm or less in the fiber preform and accordingly in the optical fiber may result in a reduction in the content of Chlorine and Chlorine containing compounds in the voids and at their surfaces corresponding to about 50% or more, such as about 60% or more, such as about 70% or more, such as about 80% or more, such as about 90% or more, such as about 95% or more, such as about 98% or more, such as about 99% or more, such as about 99.9% or more compared to case when silica material with a Chlorine concentration of about 300 ppm or more is used.

In one embodiment, the first and the third silica materials are substantially identical.

In one embodiment, the optical fiber further comprises a second type of feature comprising a void and a silica material surrounding this void, said first and second type of feature being different in at least the silica material surrounding their respective voids. The difference in the silica material may relate to the composition of the silica material that is in direct contact with the voids of the first and second type of features. The attenuation coefficient at k of the material in direct contact with the void of said second type of feature may be smaller than the first attenuation coefficient. The silica material of said second type of feature may be comprised substantially of a silica material with a Chlorine content of about 300 ppm or more. Such Chlorine content is often the result of the cleaning process aiming to reduce the OH content in the silica glass.

In one embodiment, the silica material surrounding the void in said second type of feature is substantially identical to said second silica material.

In one embodiment, said core region comprises at least one of said second type of feature. The optical fiber may be a hollow core fiber, where the void of the second type of feature forms the hollow core. This design may be used in configurations, where the guiding properties of the hollow core requires or benefits from having the feature defining the core region formed substantially in silica material with an attenuation coefficient or a OH content being different from that of the first silica material. In such an embodiment, the optical fiber still presents an improvement over prior art optical fibers if the inner cladding comprises a plurality of said first type of features.

The inner cladding region may comprise a plurality of said first type of feature and a plurality of said second type of feature. In one embodiment, the first and second type of features are arranged so that the part of the inner cladding region closest to the core region comprises a majority of said first type of feature. This arrangement may for instance be preferred when the Chlorine induced end facet degradation is to be kept at a minimum close to the core, while it is less important to avoid the formation of Chlorine containing compound at the end face parts not in the immediate vicinity of the core.

In one embodiment, the first and second type of features are arranged so that the part of the inner cladding region closest to the core region comprises a majority of said second type of feature. This arrangement may for instance be preferred when the often higher attenuation in the first silica material is considered to be a potential problem for the guiding properties of the optical fiber, and the presence of the first type of feature close to the core where the power in glass fraction may be high should be avoided or kept at a minimum. In one embodiment, the core may be surrounded by e.g. one or two rings comprising a majority of second type of feature, and further surrounding these rings are then placed one or more rings comprising a majority of first type of feature. Thereby the presence of first silica material in parts of the inner cladding regions with a high power in glass fraction is kept at a minimum while end facet degradation still is mitigated by having a part of the inner cladding region being comprised of a plurality of first type of feature.

In one embodiment, the optical fiber further comprises an outer cladding region surrounding said inner cladding region, said outer cladding region comprising an outer cladding silica material. The outer cladding silica material may be substantially identical to said first silica material. The outer cladding silica material may be substantially identical to said second silica material or in principle be any silica material suited for the production of silica based optical fibers.

In one embodiment, the inner cladding part of the fiber preform comprises a plurality of precursor elements arranged in a substantially periodic arrangement in said cross section. The periodic arrangement may comprise a closed packed hexagonal structure.

In one embodiment, the method is adapted to form a hollow core optical fiber. A hollow core optical fiber may be formed from a preform comprising a substantially periodic arrangement of precursor elements in the inner cladding part, and the core part may be defined by removing at least one precursor element from this periodic arrangement of precursor elements. In one embodiment, 7 or 19 precursor elements are removed from this periodic arrangement of precursor elements to define the core part. In principle may any number of precursor elements be removed from the periodic arrangement to e.g. provide a hollow core which is elongated in the fiber cross-section.

In one embodiment, the inner cladding part comprises a plurality of first type of precursor element. If the first type of precursor elements are arranged in a closed packed hexagonal structure, the corresponding plurality of first type of feature in the inner cladding region will described a triangular pattern as seen in Large Mode Area Photonic Crystal Fibers and in some hollow core Photonic Bandgap Fibers. In one embodiment, the prefrom according to the present invention comprises tubes arranged in a manner whereby a Hollow-core Photonic Crystal Fiber or a Solid-Core PCT can be drawn from the preform. The core part may also be formed by a first type of precursor element with a cross sectional dimension which is larger than the cross section dimension of the plurality of first type of precursor element arranged in the inner cladding part. The core part may also be formed by a first type of precursor element which is pressurized to a higher level than the plurality of first type of precursor element arranged in the inner cladding part, whereby cross sectional dimension of the first type of feature in the core region is larger than the cross section dimension of the first type of feature in the inner cladding region.

In one embodiment, first type of precursor element further comprises a second silica material having a second attenuation coefficient, $\alpha_2$, at $\lambda$ and a second chlorine concentration, $c_2$. The second silica material may be arranged to surround said first silica material or the first silica material may be arranged to surround said second silica material.

In one embodiment, the first type of precursor element comprises a third silica material having a third attenuation coefficient, $\alpha_3$, at k and a third chlorine concentration, $c_3$, of about 300 ppm or less, wherein said third silica material is arranged to surround said first and second silica materials.

One object of the present invention is to provide a method of reducing ammonium chloride contamination in Photonic Crystal Fiber, said method comprising providing a stack of first type of precursor elements to form a Photonic Crystal Fiber preform, wherein said first type of precursor elements are made from silica glasses with a Chlorine content of less than 300 ppm. The Chlorine content in the silica may be about 250 ppm or less, such as about 200 ppm or less, such as about 150 ppm or less, such as about 100 ppm or less, such as about 50 ppm or less, such as about 25 ppm or less, such as about 10 ppm or less, such as about 5 ppm or less, such as about 1 ppm or less, such as about 0.5 ppm or less, such as about 0.2 ppm or less, such as about 0.1 ppm or less, such as about 0.01 ppm or less, such as substantially free of Chlorine. The optical fiber formed using this method may be a Hollow-Core Photonic Crystal Fiber or a Solid-Core Photonic Crystal Fiber. The precursor elements may also be referred to as capillary tubes.

A method of reducing ammonium chloride contamination in silica based Photonic Crystal Fiber may comprise providing Hydrogen ions to the silica material to form Hydrogen Chloride molecules with the Chlorine present in said silica material or the Chlorine forming compounds at the surface of the voids. The hydrogen may be provided to the silica material by high pressure Hydrogen loading, which may be performed at a hydrogen pressure of about 1 to about 2000 bars, such as of about 10 to about 1500 bars, such as of about 25 to about 1000 bars, such as of about 50 to about 500 bars, such as of about 100 to about 300 bars. Out-diffusion of said Hydrogen Chloride following its formation is accelerated by heating the silica material in e.g. a bake. The hydrogen loading may be performed to the preform prior to the drawing of the optical fiber or to the produced optical fiber. Deuterium may be used instead of hydrogen.

The capillary tubes are sealed using a flame from for example high-purity hydrogen and oxygen. In one embodiment, said sealed ends are cleaned by an etching process, such as etching by using a Hydrogen Fluoride etch.

The silica material may be selected from the group of natural occurring quartz and thermal oxide glass.

One object of the present invention is to provide a method of producing a preform for a Photonic Crystal Fiber comprising:
a. providing a number of capillary tubes made from a silica material;
b. optionally seal at least a part of said capillary tubes in one or both ends;
c. HF-wash at least a part of said capillary tubes;
d. rinse and dry at least a part of said capillary tubes;
e. assemble a stack from said capillary tubes to form a HC fiber preform;
wherein the Chlorine content in the silica material of said capillary tubes is reduced to below 300 ppm during steps b to d.

In the following, the design and application of an optical fiber according to the invention will be discussed in connection with examples.

BRIEF DESCRIPTION OF DRAWINGS

The invention will be explained more fully below in connection with a preferred embodiment and with reference to the drawings in which.

The figures are schematic and may be simplified for clarity. Throughout, the same reference numerals are used for identical or corresponding parts.

DETAILED DESCRIPTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

In the following examples to further illustrate preferred embodiments of the present invention(s) are described.

Figure 3:
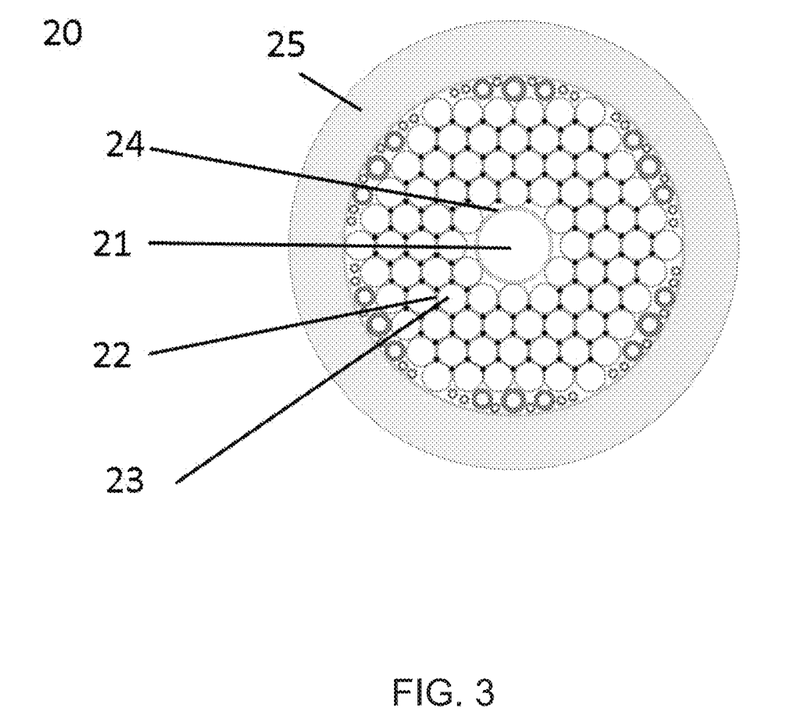
FIG. 3 shows a schematic illustration of a preform for the production of a HC-PCF comprising a stack of capillary tubes and an overcladding tube.

FIG. 3 shows a schematic illustration of a preform 20 for the production of a HC-PCF comprising a stack of precursor elements 22 each comprising a void 23, and an overcladding tube 25. The core part comprises a precursor element 24 with a void 21. Both the precursor elements of the core and the inner cladding region may be of the first type of precursor element. Additional elements may be included in the stack, such as for example solid rods at interstitial sites in the cladding, a hollow tube (in the center) and filling rods to for example assist mechanically stability of the stacked perform. The figure is schematic and simplified for clarity, and just shows details, which ease the understanding of the invention, while other details are left out.

Figure 4:
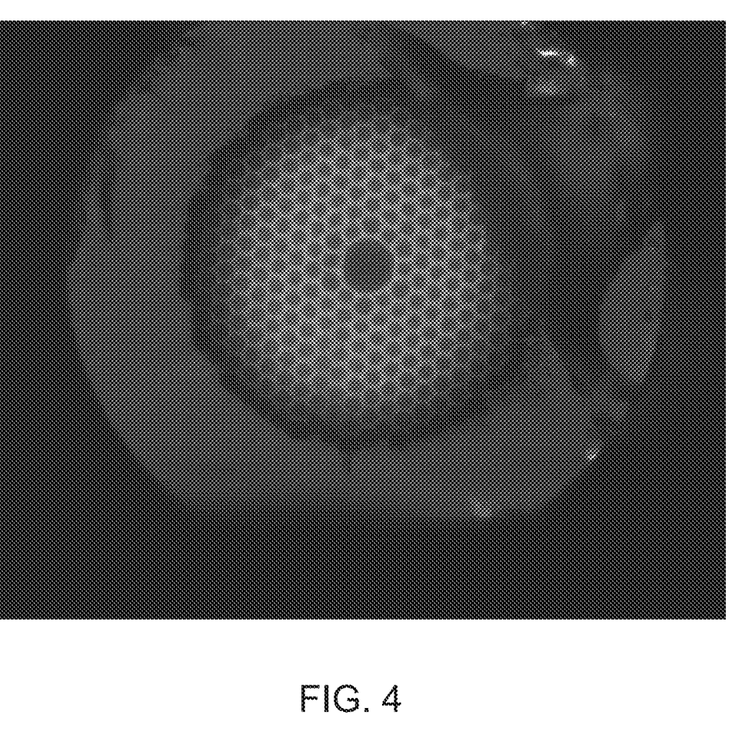
FIG. 4 shows the end facet of an optical fiber according to the present invention.
Figure 5:
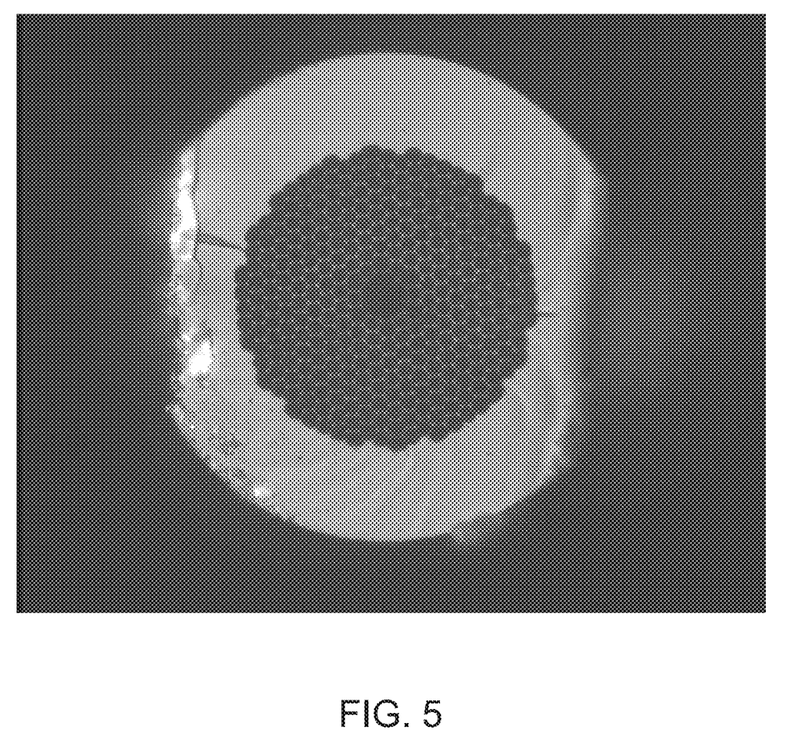
FIG. 5 shows the end facet of an optical fiber according to the present invention

The use of silica material with a Chlorine content of about 300 ppm or less drastically reduces the amount of contamination as illustrated using FIG. 4 and FIG. 5.

In FIG. 4 was taken 4 days after the cleaving of the fiber and only sub-micron sized droplets are forming on the glass part of the end-facet. The end facet contamination is clearly mitigated when using silica materials with a very limited content of Chlorine (<300 ppm) for the precursor elements. This could for example be F100/F110 glass from HERAEUS or crystalline $SiO_2$ from commercial vendors. On FIG. 5 is shown a microscope image of the end facet of a HC fibers build form capillary tubes drawn from F110 glass taken 4 days after the cleaving of the fiber. The use of this material effectively cancels the building up of end facet contamination over time. As it was also concluded above, it is highly plausible the facet contamination is related to the presence of Cl in the glass material constituting the fiber.

Figure 6:
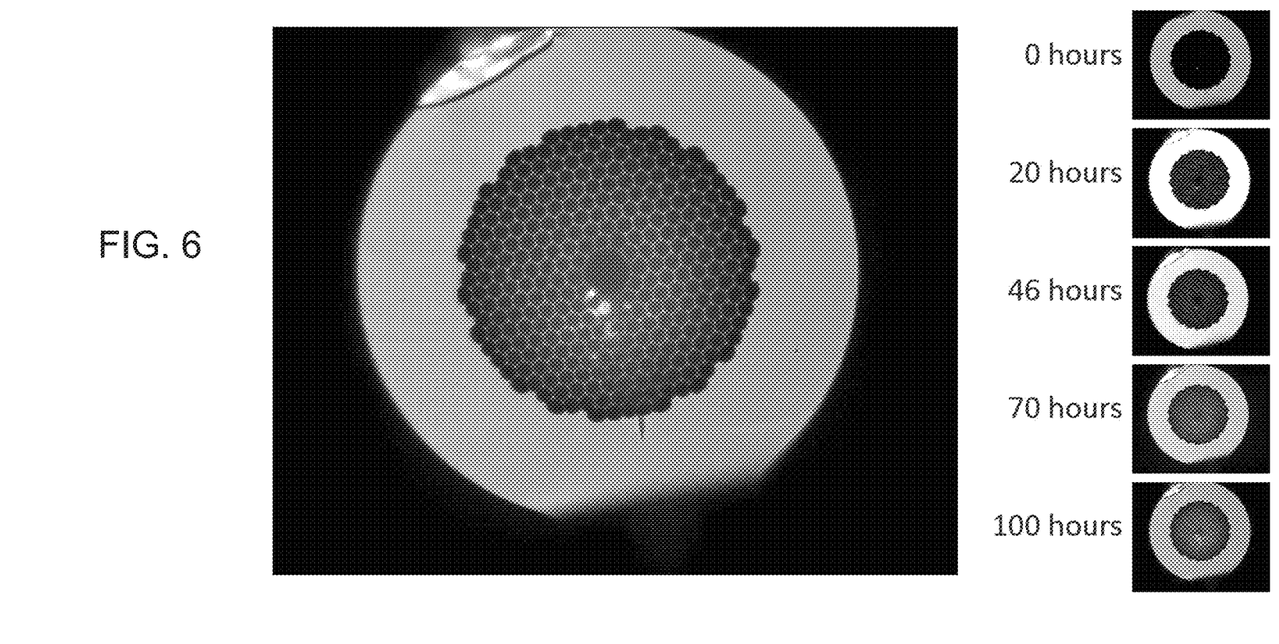
FIG. 6 shows the end facet of an optical fiber according to the present invention imaged over several hours.
Figure 7:
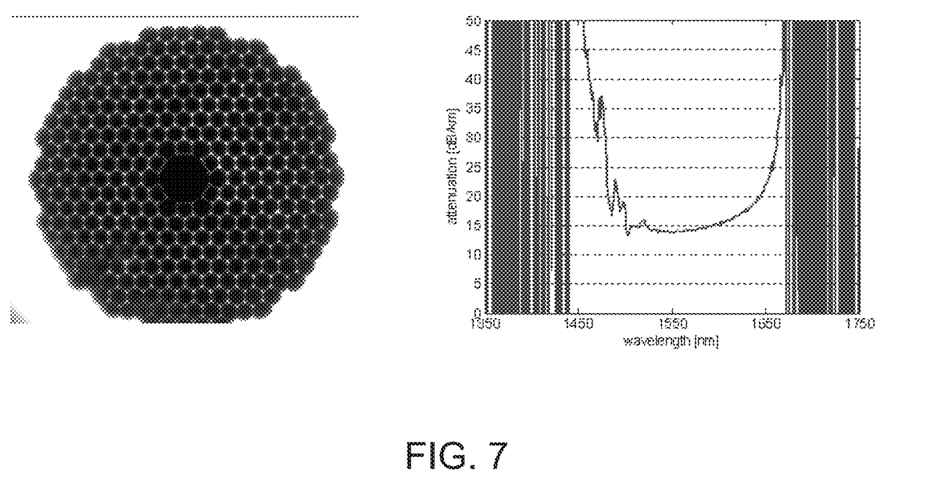
FIG. 7 shows the end facet of an optical fiber according to the present invention and the attenuation of a mode propagating in the core.

FIG. 6 shows measurement results for another optical fiber produced using a preferred embodiment of the present invention, where images of the end facet are taken several hours after cleaving the optical fiber. The largest image showing the end facet 100 hours after cleaving The inventors have shown that PCFs can be produced in silica material with a low Chlorine content. FIG. 7 shows the end facet of an optical fiber according to the present invention and the attenuation of a mode propagating in the core. At 1550 nm the attenuation 14.0+/−0.7 dB/km, while the lowest attenuation of 13.2+/−0.4 dB/km is obtained at 1504 nm. The 10 dB Band gap Width is 173 nm (1654-1481) and the number of scatter points is 1 $km^{-1}$.

Figure 8:
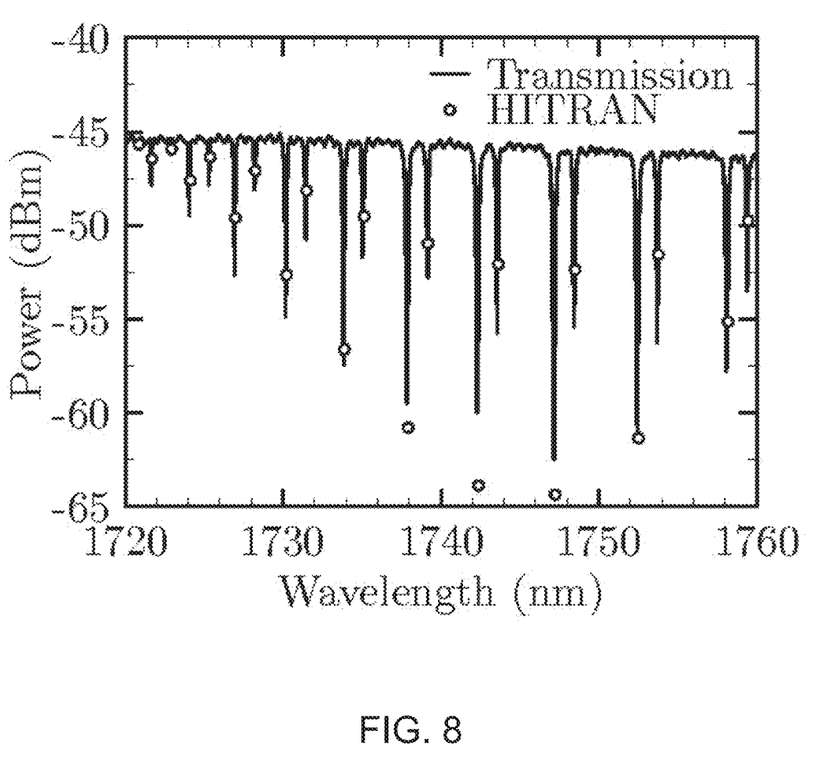
FIG. 8 shows the measurement of HCl in the hollow core of a prior art fiber.

The present inventors have realized methods for monitoring or characterizing the amount of gasses in hollow core fibers. Preferably, the methods are used for sensor and/or measuring applications. In FIG. 8 is shown a measurement of the HCl content in the hollow core clearly indicating the this Chlorine compound is present in the core region of the fiber and diffusion of Chlorine to the fiber and may be the reason for end fact degradation in optical fibers with a Chlorine content of more than 300 ppm. The absorption peaks measured on the hollow core fibres most probably stems from the first overtone of the HCl rotations and vibrations.

The present inventors have realized that further improvements to HC fibers may be obtained using for example bake out of preforms and/or improvements to the fiber drawing process. These improvements include flushing preform with gasses, such as Oxygen, Ar, or other types of inert gasses. In particular, flushing preforms before, during or after fibers drawing is advantageous. In particular, it is preferred that flushing with gasses having low $N_2$ level in order to reduce or eliminate Ammonium hydroxide at fiber end facets and/or inside fibers with holes.

The reaction to generate Ammonium hydroxide may be written as:

$NH_3 + H_2O \rightarrow NH_4^+ OH^-$ (water solution)

$NH_4^+ OH^- + HCl \rightarrow NH_4Cl + H_2O$

Notice that Ammonium hydroxide has a boiling point of 38-100° C. (reference: Sigma-Aldrich).

Typically, all substances are introduced or appearing during production of in HC fibers.

In some embodiments, the Chlorine level in the silica glass is kept at a low level by avoiding the used of Chlorine cleaning and/or using silica that has not undergone Chlorine cleaning steps at manufacture, Nitrogen during pressure control is avoided (Helium may be used as flush gas on stack to avoid Nitrogen in the stack), Argon gas may be used for pressure control in process steps, such as fiber drawing process step, and the water content in the silica is kept at a low level by controlling gas composition during process steps (sealing and flushing prior to heating steps).

A gas flow, such as Argon flow, through the cane may be used. Optionally, a bake-out before drawing a fiber from the preform is made.

In further embodiments, cold traps are used. For example, peltier elements and/or dry ice is preferred to liquid Nitrogen to avoid pressure instabilities in pressure control using either Nitrogen or Argon.

The method according to the present invention may furthermore comprise the steps of a Bake-out and/or a flushing with a gas selected from the group of Ar, $O_2$, He, Ne, Kr, or Xe.

The present invention is not limited to specific PCF designs, but may be utilized in general to produce any kind of optical fibers comprising one or more voids. The various preferred embodiments and improvements may be used independently or in any combination.

The invention is applicable to transmission systems, gyroscopes, and sensors in general, gas lasers, and lasers and amplifiers in general, pulse compression, dispersion compensation, but it is not limited to such uses.

Some embodiments have been shown in the foregoing, but it should be stressed that the invention is not limited to these, but may be embodied in other ways within the subject-matter defined in the following claims. Various modifications and applications may occur to those skilled in the art without departing from the true spirit and scope of the invention as defined in the appended claims.

The invention claimed is:

1. A hollow core optical fiber adapted to guide light at a wavelength λ, said optical fiber having an axial direction and a cross section perpendicular to said axial direction, said optical fiber comprising:
   a hollow core region,
   an inner cladding region surrounding said core region, and
   an end facet at an end of the optical fiber,
   where at least a portion of the optical fiber is comprised of a first type of feature comprising a void and a surrounding first silica material, said first type of feature extending along at least a part of said axial direction, said first silica material having a first attenuation coefficient, $\alpha_1$, at λ and a first chlorine concentration, $c_1$, of about 300 ppm or less, providing that diffusion of chlorine to the end facet and resulting chlorine-induced degradation of the fiber end facet is mitigated.

2. The hollow core optical fiber according to claim 1, wherein said inner cladding region comprises a plurality of said first type of feature.

3. The hollow core optical fiber according to claim 2, wherein said plurality of said first type of feature is arranged in a non-periodic pattern in the inner cladding region.

4. The hollow core optical fiber according to claim 2, wherein said plurality of said first type of feature is arranged in a periodic pattern in the inner cladding region.

5. The hollow core optical fiber according to claim 1, wherein said first silica material is arranged in a substantially annular region with a thickness in the range of about 10 nm to about 5000 nm.

6. The hollow core optical fiber according to claim 1, wherein the first chlorine concentration, $c_1$, is about 200 ppm or less.

7. The hollow core optical fiber according to claim 1, wherein the first chlorine concentration, $c_1$, is about 100 ppm or less.

8. The hollow core optical fiber according to claim 1, wherein the silica glass is substantially free of chlorine.

9. The hollow core optical fiber according to claim 1, wherein said fiber is adapted to guide light at a wavelength $\lambda$ in the range from 800 nm to 2500 nm.

10. The hollow core optical fiber according to claim 1, wherein said fiber is adapted to guide light at a wavelength $\lambda$ in the range from 1481 nm to 1654 nm.

11. The hollow core optical fiber according to claim 1, wherein the voids in said first type of feature have a surface and said first silica material is arranged to reduce the content of Chlorine or Chlorine compounds at or near the surfaces of the voids in said first type of feature.

12. The hollow core optical fiber according to claim 1, wherein said first silica material of the plurality of first type of feature mitigates diffusion of chlorine into the voids of the plurality of the first type of feature, thus reducing migration of the chlorine to the end facet.

13. The hollow core optical fiber according to claim 1, wherein said first type of feature further comprises a second silica material with a second attenuation coefficient, $\alpha_2$, at $\lambda$ and second chlorine concentration, $c_2$.

14. The hollow core optical fiber according to claim 13, wherein said second attenuation coefficient is smaller than said first attenuation coefficient.

15. The hollow core optical fiber according to claim 13, wherein said first silica material is arranged to surround said second silica material.

16. The hollow core optical fiber according to claim 15, wherein said first silica material is arranged to provide a diffusion barrier for Chlorine situated in said second silica material, thereby mitigating the diffusion of said Chlorine into said voids of said first type of feature.

17. The hollow core optical fiber according to claim 1, further comprising a second type of feature comprising a void and a silica material surrounding this void, said first and second type of feature being different in at least the silica material, where said difference in the silica material relates to the composition of the silica material that is in direct contact with the voids of the first and second type of features.

18. The hollow core optical fiber according to claim 17, wherein said inner cladding region comprises a plurality of said first type of feature and a plurality of said second type of feature,
wherein the first and second type of features are arranged so that the part of the inner cladding region closest to the core region comprises a majority of said first type of feature, or
wherein the first and second type of features are arranged so that the part of the inner cladding region closest to the hollow core region comprises a majority of said second type of feature.

19. A hollow core optical fiber adapted to guide light at a wavelength $\lambda$, said optical fiber comprising a plurality of voids extending in the longitudinal direction of the fiber, wherein said optical fiber is improved by having at least one of said voids surrounded by a first silica material having a first chlorine concentration, $c_1$, of about 300 ppm or less.

20. The hollow core optical fiber according to claim 19, further comprising an end facet at an end of the optical fiber.

* * * * *